United States Patent [19]

Forth et al.

[11] Patent Number: 4,833,692
[45] Date of Patent: May 23, 1989

[54] NON-LINEAR AMPLIFIER FOR DIGITAL NETWORK

[75] Inventors: Leslie Forth, Manchaca; Wallace Lively, Austin, both of Tex.

[73] Assignee: Advanced Micro Devices, Inc., Sunnyvale, Calif.

[21] Appl. No.: 91,685

[22] Filed: Aug. 31, 1987

[51] Int. Cl.$^4$ ............................................. H04L 25/34
[52] U.S. Cl. ..................................... 375/17; 375/76; 307/360
[58] Field of Search ............................ 375/76, 98, 17; 307/356, 357, 360, 361; 455/245, 247, 249, 250, 251; 328/171

[56] References Cited

U.S. PATENT DOCUMENTS

| | | | |
|---|---|---|---|
| 3,778,722 | 12/1973 | Stein | 375/76 |
| 4,007,382 | 2/1977 | Warberg | 307/360 |
| 4,023,046 | 5/1977 | Renirie | 307/360 |
| 4,280,221 | 7/1981 | Chun et al. | 375/17 |
| 4,581,725 | 4/1986 | Pilarcik, Jr. | 375/76 |
| 4,584,690 | 4/1986 | Cafiero et al. | 375/76 |
| 4,679,209 | 7/1987 | Hogeboon et al. | 375/17 |
| 4,697,275 | 9/1981 | Lave | 375/76 |

Primary Examiner—Robert L. Griffin
Assistant Examiner—Stephen Chin
Attorney, Agent, or Firm—Mark Levy; Kenneth B. Salomon

[57] ABSTRACT

Method and apparatus are disclosed providing selective amplification of signals whereby signals exceeding a threshold voltage are amplified while signals below the threshold voltage are attenuated. The invention is preferably employed in a receiver of signals on an ISDN and reduces errors in the first data bit following framing bits. Furthermore, noise components in the received signals are attenuated. An operational amplifier (28) has an amplification determined by the ratio of a feedback resistance (30) to an input resistance. The input resistance consists of a first resistor (26), and a second resistor (24), which can be selectively placed in series with the first resistor. A pair of series-connected diode pairs (16, 18, 20, 22) are connected in parallel with the second resistor. One pair of series-connected diodes oriented oppositely to the other pair. The forward-biased saturation voltage of the series-connected pairs of diodes determine the threshold voltage of the non-linear amplifier.

3 Claims, 1 Drawing Sheet

4,833,692

NON-LINEAR AMPLIFIER FOR DIGITAL NETWORK

This invention relates to telecommunications on a digital network providing voice and data signals and, more particularly, to an amplifier in a receiver exhibiting non-linear amplification to speed recovery after reception of the first bit of a frame.

BACKGROUND OF THE INVENTION

An Integrated Services Digital Network (ISDN) provides both voice and data telecommunications in accordance with a set of standard interfaces. Familiarization with ISDN standards and recommendations is useful to an understanding of the present invention. The Committee Consulative International Telephone and Telecommunications (CCITT) has prepared a number of Recommendations and reference should be had to the I-Series Recommendations for a complete discussion of ISDN nomenclature and standards.

The CCITT I-Series Recommendations specify a subscriber "S" interface to the telecommunications ISDN. Terminal Equipment (TE) at a subscriber's premises connects to the ISDN at the "S" interface reference point. Signals received over the "S" interface have a frame structure specified by the I-Series Recommendations. A pseudo-ternary code is employed and each frame starts with a framing (F) bit and DC balancing (L) bit. These bits are followed by data bits which are either a ONE at a zero level "space" or a ZERO which is alternately at a positive level and a negative level, a "mark". Thus, a three-level coding scheme is employed at the "S" interface.

ISDN receivers take the signal waveform at the "S" reference point and amplify it sufficiently so that the TE can adequately process the received signals. A step-up transformer is typically employed within the receiver at the "S" interface to connect the TE to the lines transferring signals over the ISDN.

Difficulty is experienced in receiving the first data bit following a framing bit and balance bit in the B1 channel and the first data bit following the (auxiliary) framing bit and balance bit in the B2 channel. The problem is especially acute when the value of the first data bit is ONE, i.e., a "space". This is because the terminal equipment on the network generating the signals (the "driver") turns off into a high impedance state and the change from the "mark" condition of the balance bit to the "space" of this first data bit is a relatively slow process. Exacerbating this situation is the fact that in short Passive Bus and Extended Passive Bus Configurations there are several TEs contributing to the framing bit, but only one TE driving the line during the data fields. Thus as TE's are spread out on the bus, there are timing delays between the various TE's. This staggering of TE causes broadening of the pulse shape received by the NT. In particular, the closest NT receives framing bits relatively earlier, and accordingly, an early data signal from the nearest TE is partially destroyed by framing bits received from TE's further removed.

Errors in data received by NT on the ISDN are introduced by the slow transition from the balance bit (a mark) to the first data bit (a space), because the space bit may be misinterpreted as a mark.

SUMMARY OF THE INVENTION

The instant invention provides an amplifier receiving signals over the "S" interface which amplifies voltages above or below a threshold voltage ($\pm V_{THR}$) differently, i.e., voltages having an absolute value over $V_{THR}$ are amplified but, signals below the threshold voltage are attenuated. In this manner, false identification of "spaces" as "marks" is avoided.

In addition, selective amplification of signals in the received waveform exceeding the threshold voltage restores signal strength lost in the line due to transmission attenuation. Voltages received which are close to the "space" voltage do not suffer a d.c. shift because they are attenuated. Accordingly, the waveform remains valid for data detection purposes.

The non-linear amplifier of the present invention ensures a fast return to "space" from a "mark", permitting a wider sampling window for "space" bits, thereby improving data detection speed. Furthermore, noise components less than the threshold voltage are attenuated.

In an exemplary embodiment, gains of 2 and ½ are employed in the amplifier of the present invention for signals above and below the threshold, respectively.

In a preferred embodiment of a non-linear amplifier according to the present invention, the forward voltage drop across a pair of diodes provide a reference voltage equal to the threshold voltage $V_{THR}$. The non-linear conductivity of the diodes causes the presence of a resistor connected in parallel with the diodes to be selectively included in the input path to an operational amplifier. The operational amplifier having a gain of 2 when the resistor is removed from the circuit and a gain of ½ when the resistor is included.

DETAILED DESCRIPTION OF A PREFERRED EMBODIMENT

Figure 1:
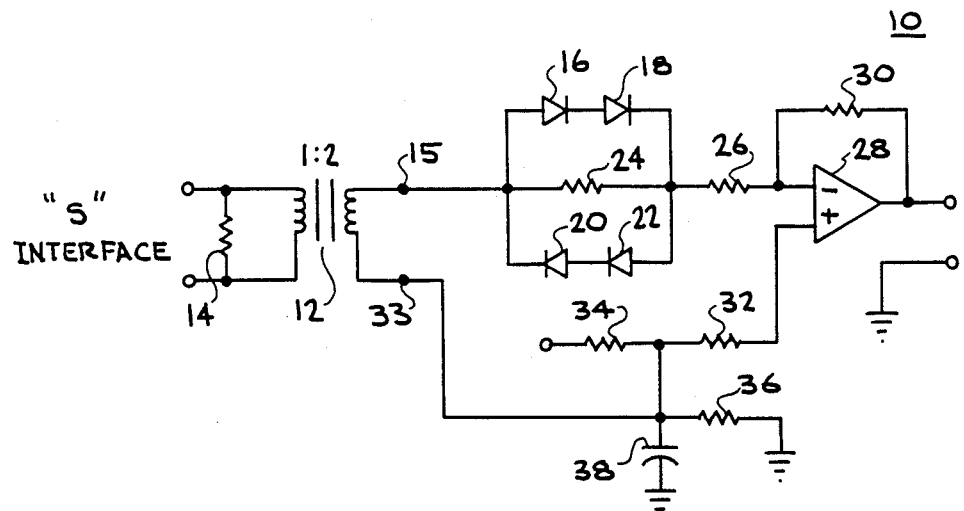
FIG. 1 is a schematic diagram of a preferred embodiment of a non-linear amplifier according to the instant invention.

A schematic diagram of a non-linear amplifier 10 according to the present invention is shown in FIG. 1. Signals at the "S" interface are received at the primary windings of a step-up transformer 12. Transformer 12 preferably has a 1:2 ratio of primary to secondary windings. A resistor 14 is connected across the primary windings of transformer 12. Connected to a first terminal 15 of the secondary windings is an anode of a diode 16. A second diode 18 is connected in series with diode 16; the anode of diode 18 connected to the cathode of diode 16. Another series-connected pair of diodes 20 and 22 are connected in parallel with the series connection of diodes 16 and 18: the anode of diode 22 connected to the cathode of diode 18, the anode of diode 20 connected to the cathode of diode 22 and the cathode of diode 20 connected to the anode of diode 16. A resistor 24 is also connected in parallel to the series connection of diodes 16 and 18 and diodes 20 and 22. In a preferred embodiment, diodes 16, 18, 20 and 22 are of a type designated 1N914.

A resistor 26 is connected between the common connection of diodes 18 and 22 and resistor 24 and an inverting input terminal of an operational amplifier (op amp) 28. Op amp 28 is preferably of a type manufactured by Advanced Micro Devices, Inc. and designated LF356. A feedback resistor 30 is connected between the output terminal of op amp 28 and its inverting input terminal. The value of resistors 26 and 30 determine the gain of the amplifier 10 for signals at the "S" interface exceeding the threshold voltage. The value of the series connection of resistors 24 and 26 and resistor 30 determining the gain at amplifier 10 for signals less than the threshold voltage.

A resistor 32 is connected between a non-inverting input terminal of op amp 28 and the second terminal 33 of the secondary winding of transformer 12. Also connected to the second terminal is one lead of a resistor 34, one lead of a resistor 36 and one lead of a capacitor 38. The second lead of resistor 36 and capacitor 38 are connected to ground; the second lead of resistor 34 is connected to a source of positive voltage.

Signals at the "S" interface are boosted by a factor of two by transformer 12. Signals at terminal 15 must be positive with respect to terminal 33 and which are less than the combined saturation forward-biased voltage drop of the diodes 16 and 18 are subject to an input resistance to op amp 28 equal to the parallel resistance of the series-connected diodes and resistor 24. Similarly, signals at terminal 15 negative with respect to terminal 33 less than the combined saturation forward-biased voltage drop of diodes 20 and 22 experience an effective input resistance to op amp 28 equal to the parallel resistance of these series-connected diodes and resistor 24.

In a preferred embodiment, the non-saturation ratio of V/I for the diodes 16, 18, 20 or 22 exceeds, by a wide margin, the value of resistor 24. Accordingly, the series values of resistors 24 and 26 are "seen" by op amp 28 as the input resistance to be used in the ratio with the value of feedback resistor 30. In a preferred embodiment resistor 24 has a value of 15,000 ohms, resistor 26 a value of 4,700 ohms and resistor 30 a value of 10,000 ohms, resulting in an amplification of $\frac{1}{2}$. The "threshold voltage" of amplifier 10 is thus set at twice the forward-biased saturation voltage of one of the diodes 16, 18, 20 or 22.

Signals at the "S" interface less than twice the saturation forward-biased voltage drop are "amplified" by a factor of $\frac{1}{2}$. After saturation of the diodes, i.e., for signals exceeding twice the forward-biased saturation voltage drop signals are amplified by op amp 28, in proportion to the ratio of the value of resistor 26 and feedback resistor 30. In a preferred embodiment these resistor values are 4,700 ohms and 10,000 ohms, respectively, resulting in a amplification by a factor of approximately 2.

Figure 2:
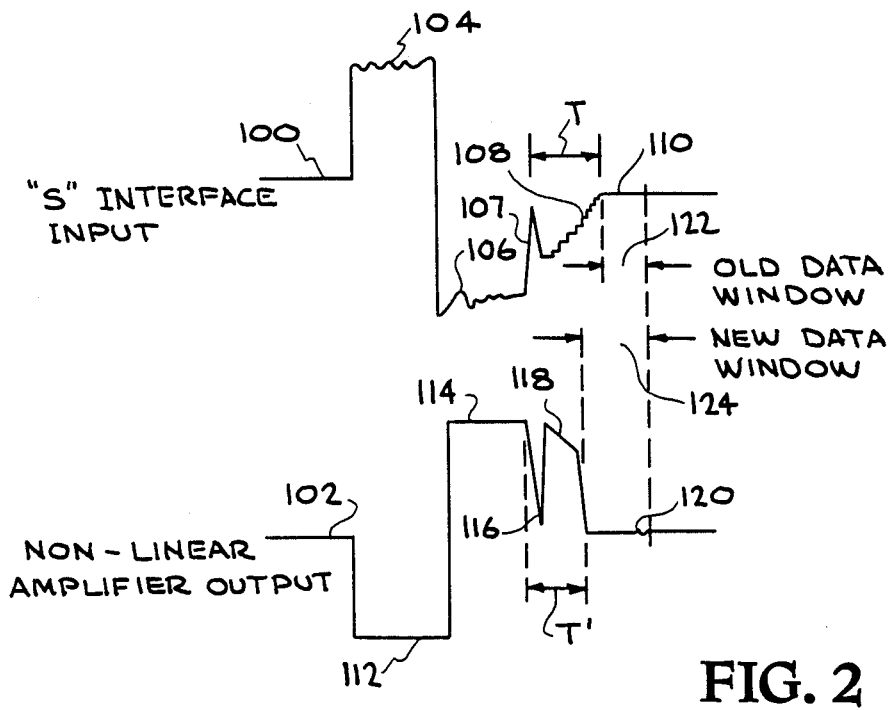
FIG. 2 is a diagram illustrating the waveforms generated by the non-linear amplifier of the instant invention.

With reference now to FIG. 2, shown are waveforms typical of signals 100 applied at the "S" interface and resulting waveforms of output signals 102 generated by the non-linear amplifier 10 of the present invention.

Waveform 100 indicates application of a frame bit 104 "mark" followed by a balance bit 106 "mark". A "spike" 107 occurs at the transition to the "space" bit condition. Spike 107 results from a line transient caused by changes in line impedance. A "space" bit 108, indicating a first data bit of ONE, is next received at the "S" interface. Because of the high impedance experienced by the circuit driving the "S" interface, the transition from mark 106 to space 108 is relatively slow; taking a time T until returning to space axis 110.

Non-linear amplifier 10 generates a complemented version of the frame bit 104, 112, and a complemented version of the balance bit 106, 114, as shown in waveform 102. Upon reception of the space bit, a "spike" 116 is generated initially at the output of amplifier 10 corresponding to the spike 107 preceding return 108 of the signal at the "S" interface to the space axis. In waveform 102, spike 116 is followed by a ramp decline 118 of relatively short duration T', and then a return 120 to the space axis. Note that $T' < < T$.

Before the instant invention, a short sampling window 122 of duration equal to the inter-bit time minus T was available, if sampling errors were to be avoided. With the non-linear amplifier 10 of the present invention, a longer sampling window 124 equal to the inter-bit time minus T' is available. This results from the attenuation of the signal applied to the "S" interface as soon as it drops to less than the threshold voltage established by the diodes 16, 18, 20 and 22. The longer sampling window provided by the instant invention affords extra protection against sampling errors. The non-linear amplifier 10 also provides amplification of "mark" signal strength making up losses due to transmission attenuation.

It will be appreciated by those skilled in the art that the non-linear transfer characteristics of the instant invention can be achieved by circuitry other than that disclosed in the preferred embodiment. For example, the use of diodes to provide a bypass path around the resistor 24, thereby controlling the non-linear amplification of the instant invention, could be achieved in other ways. Two differential comparators could be substituted for the series-connected diodes, one comparator receiving the threshold voltage $+V_{THR}$, the other receiving $-V_{THR}$. Both also receiving the signal across the secondary of transformer 12. The comparators would then generate a signal supplied to the control leg of an analog switch which, in turn, bypasses resistor 24 when in its closed state. The scope of the present invention is accordingly solely measured by the appended claims.

We claim:

1. In a receiver responsive to signals coded in a pseudo-ternary code arranged in packets in which a data signal has one of three predetermined voltage levels representing a positive mark, a negative mark or a space, said positive mark voltage and said negative mark voltage having predetermined equal magnitudes and opposite signs; the improvement characterized by a method of error-avoidance in which said received signals are selectively amplified and attenuated by amplifying with a first predetermined factor if said signal exceeds in absolute value a predetermined threshold voltage and attenuating by amplifying with a second predetermined fractional amplification factor otherwise, said threshold voltage being between said mark voltage magnitude and said space voltage level, said first predetermined amplification factor being approximately 2 and said second predetermined fractional amplification factor being approximately $\frac{1}{2}$; wherein false identification between a space or mark is avoided.

2. A receiver responsive to signals coded in a pseudo-ternary code arranged in packets, each signal having one of three predetermined voltage levels representing a positive mark, a negative mark or a space, said positive mark voltage and said negative mark voltage having predetermined equal magnitudes and opposite signs; said receiver comprising:

a selective amplifying means responsive to said received signals for amplifying said received signals by a first predetermined factor when the voltage level of said received signals exceeds in absolute value a predetermined threshold voltage and for amplifying said received signals by a second predetermined factor otherwise, said threshold voltage being between said mark voltage magnitude and said space voltage, said selective amplifying means including:

an operational amplifier means having an inverting input terminal and a non-inverting input terminal for generating at an output terminal a signal in response to the difference in signals applied at said non-inverting input terminal and said inverting input terminal;

a feedback resistor operatively connected between said inverting input terminal and said output terminal of said operational amplifier means;

resistance value generating means having an input terminal operatively coupled to and responsive to said received signals and having an output terminal operatively connected to said inverting input terminal of said operational amplifier for establishing a first or a second resistance value between said input and output terminals when said received signal has a voltage level exceeding said threshold voltage, or not exceeding said threshold voltage, respectively;

said resistance value generating means further including:

first and second diodes, said first diode having its anode terminal connected to a first terminal of said resistance value generating means, said first diode having its cathode terminal connected to the anode terminal of said second diode, and said second diode having its cathode terminal connected to a second terminal of said resistance value generating means; and third and fourth diodes, said third diode having its cathode terminal connected to said first terminal of said resistance value generating means, said third diode having its anode terminal connected to the cathode terminal of said fourth diode, and said fourth diode having its anode terminal connected to said second terminal of said resistance value generating means, wherein said threshold voltage equals the forward-biased voltage drop of said series-connected diodes.

3. In a receiver having selective amplifying means according to claim 2, wherein said resistance value generating means comprises:

a first resistor having a first terminal forming said output terminal of said variable resistance means and having a second terminal;

a second resistor having a first terminal forming said input terminal of said variable resistance means and having a second terminal connected to said second terminal of said first resistor; and means responsive to said received signals for selectively forming the series connection of said first and second resistors between said input and output terminals of said variable resistance means when said received signal does not exceed said threshold voltage and forming the connection of first resistor when said received signal exceeds said threshold voltage;

wherein said first and second amplifying factors are determined by the ratio of the resistance value of said feedback resistor to the resistance value of said first resistor, and series connection of said first and second resistors, respectively.

* * * * *